(12) United States Patent
Lok et al.

(10) Patent No.: US 10,231,464 B2
(45) Date of Patent: Mar. 19, 2019

(54) CONTROLLED SAUSAGE MANUFACTURING PROCESS

(71) Applicant: MAREL TOWNSEND FURTHER PROCESSING B.V., Boxmeer (NL)

(72) Inventors: Geert Johannes Lok, Oisterwijk (NL); Johannes Marinus Quirinus Kools, Oudenbosch (NL); Johannes Martinus Meulendijks, Deurne (NL); Patricia Rosa Maria Hoekstra-Suurs, Berghem (NL)

(73) Assignee: MAREL TOWNSEND FURTHER PROCESSING B.V., Boxmeer (NL)

( * ) Notice: Subject to any disclaimer, the term of this patent is extended or adjusted under 35 U.S.C. 154(b) by 56 days.

(21) Appl. No.: 15/317,536

(22) PCT Filed: Jun. 5, 2015

(86) PCT No.: PCT/NL2015/050414
§ 371 (c)(1),
(2) Date: Dec. 9, 2016

(87) PCT Pub. No.: WO2015/190918
PCT Pub. Date: Dec. 17, 2015

(65) Prior Publication Data
US 2017/0119001 A1 May 4, 2017

(30) Foreign Application Priority Data
Jun. 10, 2014 (NL) .................................... 2012976

(51) Int. Cl.
*A23C 13/00* (2006.01)
*A22C 13/00* (2006.01)
*A23L 13/60* (2016.01)

(52) U.S. Cl.
CPC ...... *A22C 13/0016* (2013.01); *A22C 13/0006* (2013.01); *A23L 13/62* (2016.08); *A23L 13/65* (2016.08); *A22C 2013/0023* (2013.01); *A23V 2002/00* (2013.01)

(58) Field of Classification Search
CPC ............ A23C 13/0016; A22C 13/0016; A22C 13/0006; A23L 13/65; A23L 13/62
See application file for complete search history.

(56) References Cited

U.S. PATENT DOCUMENTS

| | | | | |
|---|---|---|---|---|
| 3,622,353 A | * | 11/1971 | Bradshaw .......... | A22C 13/0006 426/284 |
| 3,767,821 A | * | 10/1973 | Deacon et al. .... | A22C 13/0016 426/276 |
| 4,138,503 A | * | 2/1979 | Ziolko ............... | A22C 13/0006 426/514 |
| 5,271,948 A | * | 12/1993 | Boni .................. | A22C 13/0016 426/278 |
| 5,599,570 A | * | 2/1997 | Stribling ............ | A22C 13/0016 426/105 |
| 5,716,656 A | * | 2/1998 | Stribling ............ | A22C 13/0016 426/140 |
| 5,795,605 A | * | 8/1998 | Morgan ............. | A22C 13/0016 426/277 |
| 6,054,155 A | * | 4/2000 | Kobussen .......... | A22C 13/0016 426/105 |
| 6,089,845 A | * | 7/2000 | Morgan ............. | A22C 13/0016 425/133.1 |
| 6,235,328 B1 | * | 5/2001 | Morgan ............. | A22C 13/0016 426/277 |
| 2003/0134014 A1 | * | 7/2003 | Bergmans .......... | A22C 13/0016 426/135 |
| 2015/0157032 A1 | * | 6/2015 | Le Paih ............. | A22C 13/0006 426/138 |

FOREIGN PATENT DOCUMENTS

| | | | |
|---|---|---|---|
| GB | 1 232 801 | * | 6/1969 |
| NL | 6909339 A | | 12/1969 |
| WO | WO 93/12660 A1 | | 7/1993 |
| WO | WO 01/41576 A1 | | 6/2001 |
| WO | WO 2014/007630 A2 | | 1/2014 |

OTHER PUBLICATIONS

Bianchi and Conio, The Role of pH, Temperature, Salt Type, and Salt Contration on the Stability of Crystalline, Helical, and Randomly Coiled Forms of Collagen, Journal of Biological Chemistry, vol. 242, No. 7, Apr. 1967, pp. 1361-1369.*

Viswanadham and Dramer, Elastic properties of reconstituted collagen hollow fibre membranes, Journal of Materials Science 11 (1976) pp. 1254-1262.*

Jeyapalina S et al: "Dynamic Mechanical Thermal Analysis (DMTA) of Leather—Part 1: Effect of Tanning Agent on the Glass Transition Temperature of Collagen", Journal of the Society of Leather Technologists and Chemists, GB, vol. 91, No. 6, Jan. 1, 2007 (Jan. 1, 2007), pp. 236-242, XP008173782, ISSN: 0144-0322, the whole document.

International Searching Authority, "Notification of Transmittal of the International Search Report and the Written Opinion of the International Searching Authority", for PCT/NL2015/050414, dated Jul. 22, 2015, 13 pages.

* cited by examiner

Primary Examiner — Erik Kashnikow
Assistant Examiner — Chaim A Smith
(74) Attorney, Agent, or Firm — Workman Nydegger

(57) ABSTRACT

The present invention relates to a method for co-extruding an elongated food product wherein the method comprises measuring the product characteristics of the viscous gelling agent provided and wherein the physical state of the collagen is controlled by balancing the process settings of the at least one subsequent processing step based upon the product characteristics measured.

8 Claims, 2 Drawing Sheets

CONTROLLED SAUSAGE MANUFACTURING PROCESS

BACKGROUND OF THE INVENTION

The present invention relates to a method for co-extruding an elongated food product comprising the following steps of: a) providing a food dough; b) providing a viscous gelling agent comprising collagen; c) co-extruding a strand of food dough and an external layer of viscous gelling agent, wherein the viscous gelling agent at least partially encloses the strand of food dough; and d) performing at least one subsequent processing step.

Such a method of co-extrusion in food products is generally known and described in, among others, Dutch patent NL 6909339. This document describes the coating of a strand of food dough with a coating layer of collagen by means of co-extrusion. Following extrusion the coated strand is guided for strengthening purposes through a coagulation bath. Under the influence of the coagulation solution the collagen coagulates and/or precipitates and the coating layer is strengthened. A strand of food dough is thus formed which is at least partially coated with a strong coating layer of collagen, i.e. casing.

A drawback of the known methods is that the characteristics of the casing material, and therefore the processability of the food product, may change during the manufacturing of the co-extruded elongated food product, i.e. sausage. The change in the characteristics of the casing material is difficult to predict. Even further, the change in the characteristics of the casing material is irreversible. Therefore, once the characteristics of the casing material have been changed the co-extruded elongated food product can no longer be processed to obtain a food product having an acceptable quality.

A particular drawback of the known methods is the use of collagen or collagen comprising viscous gelling agent as a casing material for the co-extrusion of elongated food products are the uncontrolled properties (especially the surface conditions) of the final food products. It has been observed that by changing the process settings after co-extrusion of the strand of food dough ant the casing material, the characteristics of the collagen casing material may irreversibly change. The change may include the change of surface characteristics of the casing material with regard to smoothness of the surface of the food product, i.e. the "look-and-feel" of the food product. By changing the process settings after co-extrusion in subsequent processing step, such as brining, separating, crimping, smoking, drying, packaging, cooking and/or chilling of the co-extruded elongated food product, the obtained food product may, different from the normally desired smooth, nice looking and stable surface, uncontrolled change into a food product with undesired surface conditions like e.g. sticky, inconsistent and/or smudgy surfaces. Such uncontrolled irreversible change in surface characteristics results in the less processability of the food product and, as a consequence, the food product may even have to be discarded.

In view of the above there is a need to enhance the control of the production of co-extruded elongated food products, and more specific to enhance the control of the product characteristics of the casing material during the manufacturing and the further life stages of the food products.

SUMMARY OF THE INVENTION

The present invention provides for this purpose a method of the type stated in the preamble with which the desired control of the co-extruded food products can be obtained. It was found that the processability of the co-extruded elongated food product and the unexpected irreversible change in casing characteristics strongly depends on the physical state of the collagen or collagen containing casing material, hereinafter referred to as "the collagen". As a consequence, by controlling the physical state of the collagen, the change in casing characteristics, such as smoothness of the surface of the casing, can be controlled, i.e. prevented.

DETAILED DESCRIPTION OF THE PREFERRED EMBODIMENTS

Figure 1:
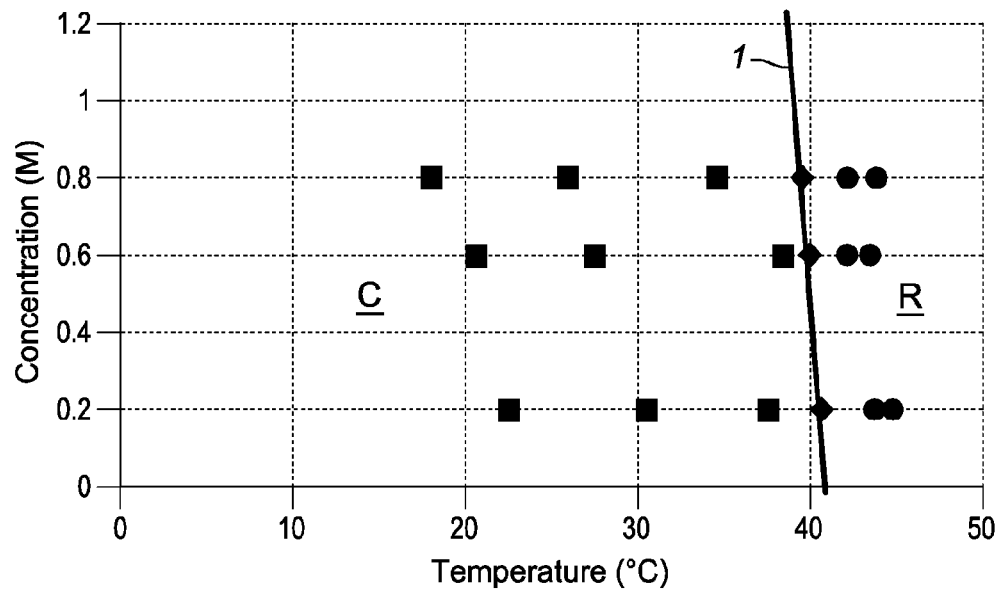
FIG. 1 is a chart showing concentration versus temperature.

The present invention provides hereto a method of the type stated in claim 1 wherein the method comprises measuring the product characteristics of the viscous gelling agent provided in step b) and wherein the physical state of the collagen is controlled by balancing the process settings of the at least one subsequent processing step based upon the product characteristics measured. It was found that the physical state of the collagen can be controlled by balancing the process settings of the at least one subsequent processing step, i.e. processing step d), based upon the measured product characteristics of the in step b) provided viscous gelling agent before co-extruding a strand of food dough and an external layer of viscous gelling agent, i.e. processing step c). By controlling the physical state of the collagen based upon the measured product characteristics of the collagen used for the process, the method of the present invention enables the manufacturer to change any process setting in any subsequent processing step to obtain food products of acceptable quality without running the risk that the product characteristics unexpectedly change during any subsequent processing step, resulting in the rejection of processed food products. In other words, based upon the measured product characteristics, the physical state transition point can be predicted before starting the process of manufacturing co-extruded elongated food products. Therefore, by providing a method wherein the physical state transition point of the used collagen can be predicted in advance, the method of the present invention provides a process setting framework, within which the manufacturer may change the process settings, depending on the desired quality and type of the food product to be obtained.

Preferably the product characteristics measured include the pH, salt concentration and/or salt type of the viscous gelling agent. It was found that by characterizing the viscous gelling agent based upon the pH, salt concentration and/or salt type used, a framework can be established within which the process settings may be adjusted during any subsequent processing step, without running the risk of irreversibly changing the product characteristics of the casing material, i.e. the collagen.

As already mentioned above, the subsequent processing steps may be any processing step required for obtaining an edible food product. Therefore the at least one subsequent processing step as define in processing step d) may comprise brining, separating, crimping, smoking, drying, packaging, cooking and/or chilling of the co-extruded elongated food product. To prevent any irreversible change of physical state of the collagen, the process settings of these subsequent processing steps needs to be balanced such that the predicted physical state transition point is not reached.

In an embodiment of the method of the present invention, the to be balanced process settings are selected from the pH, salt concentration and temperature. By balancing the pH, salt and temperature of any subsequent processing step, the physical state of the collagen can be controlled in a sufficient and predictable manner. For example, by increasing the temperature of the collagen casing material during a subsequent processing step the pH of the collagen casing material may be increased as well to prevent a change in the physical state of the collagen.

Three types of physical states of the collagen have been identified: the crystalline phase, the helical phase and the randomly coiled phase. It was found that the irreversible change in casing characteristics is expected in case the collagen in the helical or crystalline form is converted into a collagen having a randomly coiled form. The collagen casing of the food product comprising a collagen in the helical or crystalline form is characterized by a smooth, attractive looking and/or stable surface, whereas the collagen casing of the food product comprising a collagen in the randomly coiled form exhibits a more sticky, inconsistent and/or smudgy surface. As a consequence, in an embodiment of the method of the present invention, the collagen is in the helical and/or crystalline form.

In a further embodiment of the present invention, the process settings are selected such that the physical state of the collagen may vary between the helical and crystalline form during the at least one subsequent processing step. Since either the helical or crystalline physical state of the collagen have a positive effect onto the casing product characteristics of the food product, the actual state of the collagen may vary between those two states.

In a preferred embodiment of the method of the present invention the process settings are selected such that the physical state of the collagen does not change during the at least one subsequent processing step. To maintain the same product characteristics, such as surface smoothness, surface colour, cooking characteristics of the obtained food product, or the like, it is in particular advantageous to maintain the same physical state of collagen during the co-extrusion processing step c) and any further subsequent processing step d).

Even further, particular good results are obtained wherein the process settings are selected such that the collagen is in the crystalline form during the co-extruding step c). In particular, particular good results are obtained wherein the process settings are selected such that the collagen is in the crystalline form during any subsequent processing step d).

EXAMPLES

Collagen gels were prepared. The viscosity of the collagen gels was measured by using rotary viscometers, e.g. bob-in-cup and parallel plates, wherein the pH of the gels and the salt concentration of the salt present in the collagen gel, i.e. sodium chloride, was varied. The pH, temperature and concentration of salt, were varied and the starting point of the decrease in viscosity, i.e. the melting point of the collagen gel, was measured. Based on the different melting points, the phase change of the collagen gel was identified.

Figure 2:
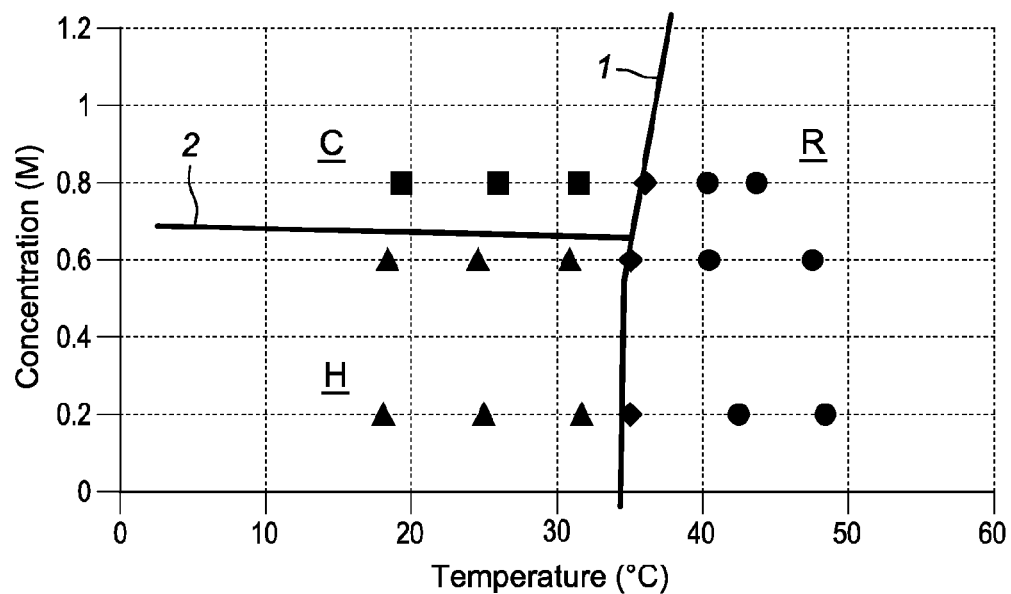
FIG. 2 is a chart showing concentration versus temperature.
Figure 3:
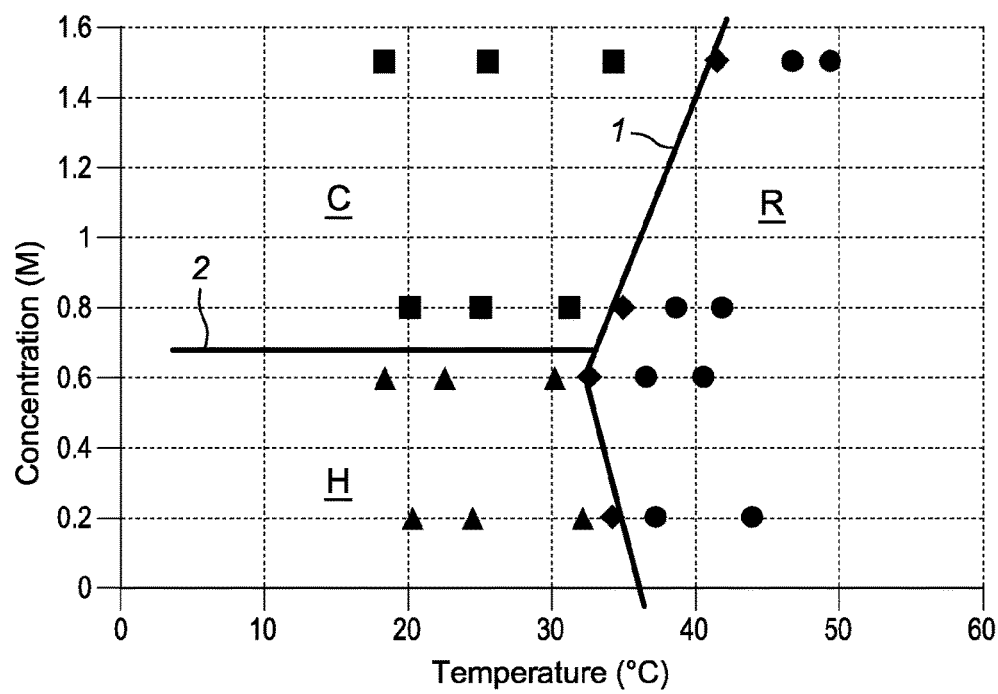
FIG. 3 is a chart showing concentration versus temperature.
Figure 4:
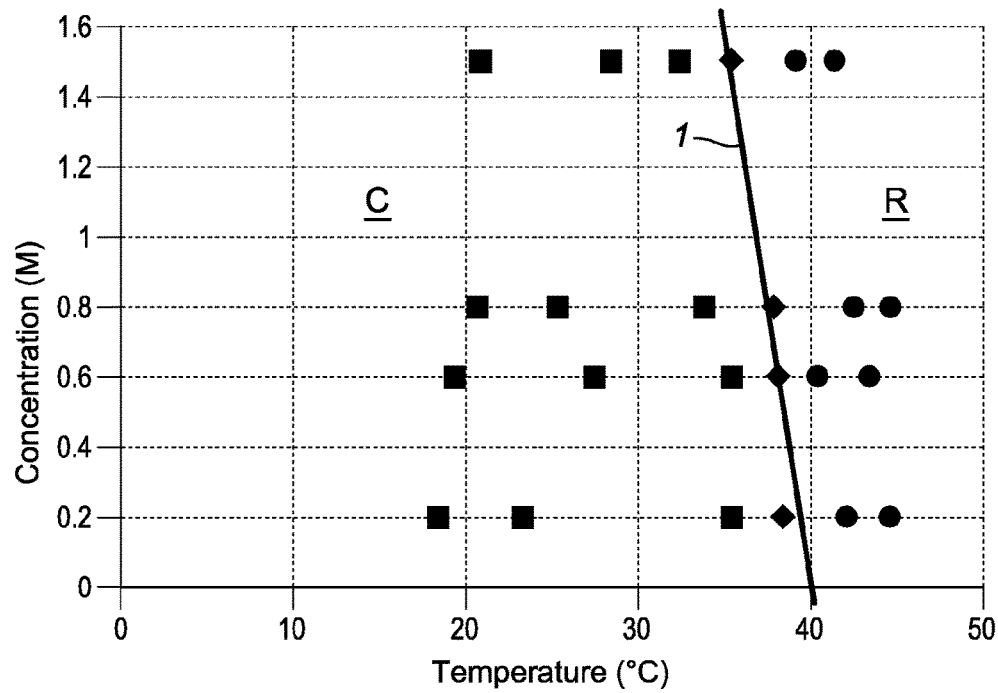
FIG. 4 is a chart showing concentration versus temperature.

The results of the above rheology analyses are shown in FIGS. 1-4. FIG. 1 shows the rheology analyses of a strong acid based collagen gel and sodium chloride at a pH of 6.5-7.5. FIG. 2 shows the results of a strong acid based collagen gel and sodium chloride at a pH of 2.7-2.9. Weak acid based collagen gels and sodium chloride at different pH are shown in FIG. 3 (pH of about 3.3) and FIG. 4 (pH of about 6.6).

The different phases of the collagen gel has been identified. Lines 1 and 2 indicate the transition point by increasing temperature or fluctuating salt concentration at which the phase of the collagen gel changes. The different phases, i.e. helical H, crystalline C and random coil R, have been indicated as well.

The invention claimed is:

1. Method for co-extruding an elongated food product comprising the following steps:
   a) providing a food dough;
   b) providing a viscous gelling agent comprising collagen;
   c) co-extruding a strand of food dough and an external layer of viscous gelling agent, wherein the viscous gelling agent at least partially encloses the strand of food dough; and
   d) performing at least one subsequent processing step, wherein the collagen is in the form selected from a group consisting of a helical form and a crystalline form;
   wherein the method comprises the steps of:
   i) measuring the elongated food product characteristics of the viscous gelling agent provided in step b) including those from a group consisting of pH, salt concentration, and salt type;
   ii) predicting the physical state transition point of the viscous gelling agent provided in step b) based on the product characteristics measured in step i); and
   iii) controlling the physical state of the collagen in step d) by balancing the pH, salt concentration, and temperature to prevent conversion of the collagen into a collagen having a randomly coiled form.

2. Method according to claim 1, characterised in that the at least one subsequent processing step comprises brining, separating, crimping, smoking, drying, packaging, cooking and/or chilling of the co-extruded elongated food product.

3. Method according to claim 1, characterised in that in step d) the pH, salt concentration, and temperature are selected such that the physical state of the collagen may vary between the helical and crystalline form.

4. Method according to claim 1, characterised in that in step d) the pH, salt concentration, and temperature are selected such that the physical state of the collagen does not change.

5. Method according to claim 1, characterised in that based on the predicted physical state transition point of step ii) the pH, salt concentration, and temperature are selected such that the collagen is in the crystalline form during extruding step c).

6. Method according to claim 1, characterised in that in step d) the pH, salt concentration, and temperature are selected such that the collagen is in the crystalline form.

7. Method according to claim 1, characterised in that the physical state transition point of step ii) is predicted before starting the process of co-extruding the elongated food product.

8. Method according to claim 1, characterised in that based on the predicted physical state transition point of step ii) the pH, salt concentration, and temperature are selected such that the same physical state of collagen is maintained during step c) and step d).

* * * * *